Patented June 26, 1928.

1,675,157

UNITED STATES PATENT OFFICE.

CHARLES McCOMBIE BROWN, OF TORONTO, ONTARIO, CANADA.

PROCESS FOR THE PRODUCTION OF ALUMINA.

No Drawing.  Application filed March 17, 1926.  Serial No. 95,447.

In the process to which my invention relates the ore or other raw material containing, among other things, aluminum is heated with a sulphate of ammonium to a temperature at which ammonia is released and ammonium alum formed and the latter is leached out and separated from the solution by crystallization. The alum is then redissolved and the aluminum content of the solution precipitated as aluminum hydrate, using as the precipitant the ammonia released in the heat treatment referred to above. After removing the precipitated aluminum hydrate the solution remaining contains ammonium sulphate which is recovered by crystallization and used for the treatment of further quantities of raw material. The process is thus cyclical to the extent that the reagent is reclaimed and again used. When, however, the raw material contains substantial amounts of aluminum sulphate, as in the case of alunite, which may be represented by the formula $(Al_2O_3)_2, Al_2(SO_4)_3, K_2SO_4, 6H_2O$, the sulphur trioxid of the aluminum sulphate emerges from the process as sulphate of ammonium. In such case the process is not truly cyclical as it is necessary to supply additional ammonia from a source outside the process. The present invention provides a completely cyclical process by giving the raw material a preliminary treatment by which that portion of the sulphur which would otherwise combine with ammonia released in the furnace process is first driven off from the alunite or other similar raw material and as a consequence the ammonia so released is fully available and sufficient for the precipitation of the aluminum from the alum solution as described above.

When alunite is submitted to the above described furnace process the alumina constituent thereof forms ammonium alum and the aluminum sulphate and potassium sulphate form potash alum. As the alums are isomorphous they crystallize out together as a mixture. Treatment with ammonia precipitates all the aluminum from both alums as hydrate while potassium sulphate remains as such in solution with the resultant ammonium sulphate. The potassium sulphate may be precipitated from the solution and thus separated from the ammonium sulphate in a manner which forms no part of the present invention and which therefore need not be described. It is evident, therefore, that it is only that portion of the $SO_3$ content of the alunite which is combined with aluminum that is responsible for the formation of the excess ammonium sulphate and the consequent reduction in the amount of ammonia available for precipitation of alumina from the alum solution.

In order to render the process entirely cyclical when applied to aluminum bearing materials containing sulphuric acid in combination with aluminum, before the raw material is furnaced with a sulphate of ammonia, as above described, I subject it to calcination at a temperature at which substantially all of the combined water and that portion of the sulphur content which is not combined with potassium are driven off. As potassium sulphate and alumina are highly refractory it is possible to carry out this calcination without causing any substantial loss thereof. After the calcination the material is treated, as above described, by heating it with a sulphate of ammonium, thus releasing ammonia and forming ammonium alum. The material is then leached with water by means of which the ammonium alum is dissolved and it is separated from the solution by crystallization. The alum is then dissolved and the aluminum content precipitated as aluminum hydrate, using as the precipitant the ammonia released in the furnace treatment above referred to. The solution remaining after the removal of the precipitated hydrate contains ammonium sulphate and potassium sulphate, which salts may be separated and the ammonium sulphate again used for treating fresh quantities of the raw material.

In some cases it may be found undesirable or uneconomical to carry out the furnacing of the raw material with an ammonium sulphate in the vicinity of the alunite deposits, while at the same time it may be feasible to calcine the material before transporting it from the mine. In such case, the calcination of the ore not only prepares it for use in a truly cyclic process, as above described, but it effects also a substantial and important reduction in the weight of raw material to be transported, as the water and sulphuric anhydrid which may be driven off together make up about 42% of the weight of pure alunite. As commercial alunite ordinarily contains impurities such as silica, etc., the reduction in weight by calcination will not be as high as in the case of pure alunite but will be substantial.

I claim:

1. A cyclic process for the treatment of aluminum containing materials, in which materials some of the aluminum is combined with sulphuric anhydrid for the production of alumina which comprises calcining the raw material at a temperature sufficiently high to drive off the sulphuric anhydrid from combination with the aluminum, heating the calcined material with a sulphate of ammonium, leaching the material with water thus forming a solution containing ammonium alum, and precipitating the aluminum as hydrate by means of the ammonia released in the heat treatment and forming ammonium sulphate.

2. A process of producing alumina from raw material containing aluminum some of which is combined in the form of sulphate which consists in calcining the material, at a temperature sufficiently high to drive off combined water and sulphuric anhydrid from its combination with aluminum, heating the calcined material with a sulphate of ammonium to a temperature at which ammonium alum is formed and ammonia released, leaching out the ammonium alum, separating the aluminum from the ammonium alum by precipitation as hydrate by means of the ammonia released in the heat treatment, separating the resultant ammonium sulphate from the solution and reusing it in the heat treatment.

3. A process for the production of alumina from alunite which consists in calcining the material at a temperature at which the combined water and such of the sulphuric anhydrid as is in combination with the aluminum are substantially driven off without substantially volatilizing potassium sulphate, heating the calcined material with a sulphate of ammonium to a temperature at which ammonium alum is formed and ammonia released, leaching out the ammonium alum and separating aluminum therefrom as aluminum hydrate by precipitating with the ammonia released in the heat treatment.

In testimony whereof, I have subscribed my name.

CHARLES McCOMBIE BROWN.